United States Patent
Khawer et al.

(10) Patent No.: US 12,389,234 B2
(45) Date of Patent: Aug. 12, 2025

(54) TEST GRANTS FOR BASE STATIONS INSTALLED IN PROTECTION AREAS

(71) Applicant: Nokia Solutions and Networks Oy, Espoo (FI)

(72) Inventors: Mohammad Riaz Khawer, Wayland, MA (US); Milind M. Buddhikot, Bridgewater, NJ (US); Sebastian Yandun, Bloomfield, NJ (US); Kutlay Erman, Weehawken, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 538 days.

(21) Appl. No.: 17/776,591

(22) PCT Filed: Nov. 11, 2020

(86) PCT No.: PCT/IB2020/060625
§ 371 (c)(1),
(2) Date: May 12, 2022

(87) PCT Pub. No.: WO2021/094951
PCT Pub. Date: May 20, 2021

(65) Prior Publication Data
US 2022/0394491 A1    Dec. 8, 2022

Related U.S. Application Data

(60) Provisional application No. 62/936,237, filed on Nov. 15, 2019.

(51) Int. Cl.
*H04W 4/00* (2018.01)
*H04W 12/06* (2021.01)
(Continued)

(52) U.S. Cl.
CPC .......... *H04W 16/14* (2013.01); *H04W 12/06* (2013.01); *H04W 24/02* (2013.01); *H04W 60/04* (2013.01)

(58) Field of Classification Search
CPC .............................. H04W 16/14; H04W 60/04
See application file for complete search history.

(56) References Cited

U.S. PATENT DOCUMENTS

2005/0204197 A1* 9/2005 Uddenberg ........... G06F 11/263
                                                              714/33
2012/0270544 A1* 10/2012 Shah ...................... H04W 24/00
                                                              455/434

(Continued)

*Primary Examiner* — Elisabeth Benoit Magloire
(74) *Attorney, Agent, or Firm* — Duft & Bornsen, PC

(57) ABSTRACT

A spectrum access system (SAS) includes a transceiver configured to receive a registration request from a first base station in response to the first base station being installed. The SAS also includes a processor configured to allocate a channel in a shared spectrum and a transmission power to the first base station. The transceiver is configured to transmit a test grant authorizing the first base station to transmit on the channel at the transmission power for a predetermined time interval. The test grant is converted to a suspended grant following the predetermined time interval. In some cases, the transceiver is configured to receive the registration request from the first base station in response to the first base station being installed in a protection area.

25 Claims, 13 Drawing Sheets

(51) Int. Cl.
*H04W 16/14* (2009.01)
*H04W 24/02* (2009.01)
*H04W 60/04* (2009.01)

(56) References Cited

U.S. PATENT DOCUMENTS

| | | | |
|---|---|---|---|
| 2019/0327730 A1* | 10/2019 | Sandberg | H04L 1/1893 |
| 2019/0364565 A1* | 11/2019 | Hmimy | H04W 72/0453 |
| 2020/0059931 A1* | 2/2020 | Hannan | H04W 72/0453 |
| 2020/0187133 A1* | 6/2020 | Syed | H04W 52/365 |
| 2021/0084658 A1* | 3/2021 | Sheriff | H04W 76/10 |
| 2021/0211889 A1* | 7/2021 | Buddhikot | H04W 16/16 |
| 2021/0234964 A1* | 7/2021 | Khawer | H04M 15/66 |
| 2021/0385662 A1* | 12/2021 | Furuichi | H04W 72/23 |
| 2022/0303782 A1* | 9/2022 | Litjens | H04W 16/14 |

\* cited by examiner

TEST GRANTS FOR BASE STATIONS INSTALLED IN PROTECTION AREAS

CROSS-REFERENCE TO RELATED APPLICATION

This application is a National Stage of PCT international application Ser. No. PCT/IB2020/060625 filed on Nov. 11, 2020 which designates the United States, incorporated herein by reference, and which is based upon and claims the benefit of priority from U.S. Application No. 62/936,237, filed on Nov. 15, 2019.

TECHNICAL FIELD

This disclosure is related to the field of communication systems.

BACKGROUND

Spectrum is the most precious commodity in deploying wireless networks such as a private enterprise network. Cellular communication systems, such as networks that provide wireless connectivity using Long Term Evolution (LTE) standards, provide more reliable service and superior quality-of-service (QoS) than comparable services provided by conventional contention-based services in unlicensed frequency bands, such as Wi-Fi. The most valuable spectrum available for cellular communication is at frequencies below 6 Gigahertz (GHz) because transmissions at these frequencies do not require a clear line of sight between the transmitter and the receiver. Much of the sub-6-GHz spectrum is already auctioned off as statically licensed spectrum to various mobile network operators (MNOs) that implement cellular communication systems such as LTE networks. The 3.1-4.2 GHz spectrum is occupied by incumbents such as Fixed Satellite System (FSS) and federal incumbents such as U.S. government or military entities. For example, the 3550-3700 MHz frequency band (CBRS band) was previously reserved for exclusive use by incumbents including the United States Navy and FSS earth stations. This band of the spectrum is often highly underutilized. Consequently, organizations and vertical industries such as package distribution companies, energy producers, ports, mines, hospitals, and universities do not have access to sub-6-GHz spectrum and are therefore unable to establish private enterprise networks to provide cellular service such as LTE.

BRIEF DESCRIPTION OF THE DRAWINGS

The present disclosure is better understood, and its numerous features and advantages made apparent to those skilled in the art by referencing the accompanying drawings.

The use of the same reference symbols in different drawings indicates similar or identical items.

DETAILED DESCRIPTION

Figure 1:
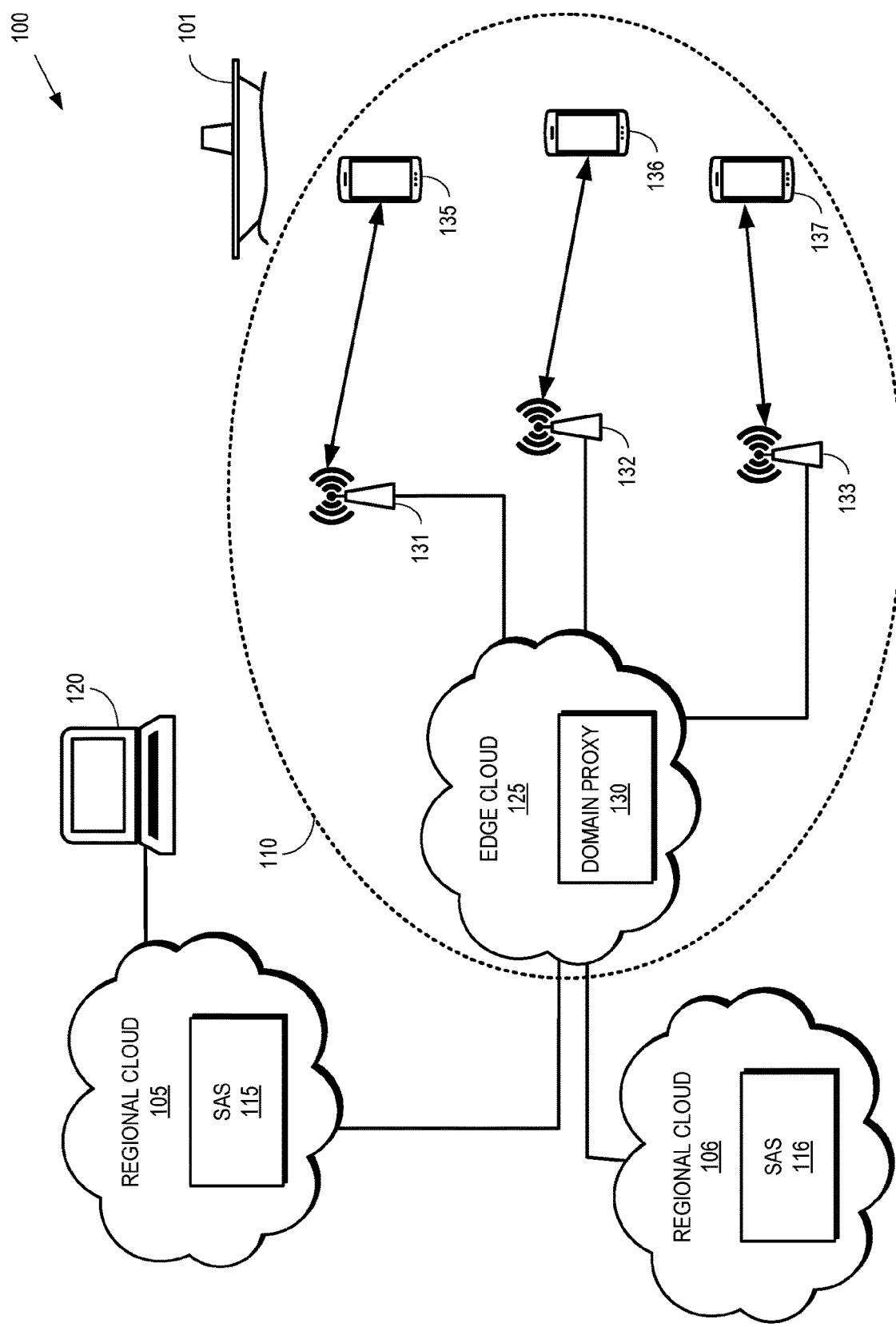
FIG. 1 is a block diagram of a communication system according to some embodiments.

The Federal Communication Commission (FCC) has begun offering bands of spectrum owned by federal entities for sharing with commercial operations. For example, newly issued FCC rules in 47 Code of Federal Regulations (CFR) Part 96 allows sharing of the 3550-3700 MHz Citizens Broadband Radio Service (CBRS) between incumbents and other operators. The CBRS operates according to a tiered access architecture that distinguishes between incumbents, operators that have received a priority access license (PAL) consistent with 47 CFR § 96.23, et seq., and general authorized access (GAA) operators that are authorized to implement one or more base stations, wireless devices, or wireless access devices such as Citizens Broadband radio Service Devices (CBSDs) consistent with 47 CFR § 96.33, et seq. Incumbents, PAL licensees, and GAA operators are required to request access from a spectrum access system (SAS), which allocates frequency bands to the operators, e.g., for CBRS within the 3550-3700 MHz band. The SAS is responsible for managing or controlling different types of CBSDs in the CBRS frequency bands.

In current deployments, the CBSD are categorized as:
Category A—CBSDs designed for indoor deployments with a maximum transmission power limit of 30 dBm,
Category B—CBSDs designed for outdoor deployments with a maximum transmission power limit of 47 dBm.
CPE—CBSDs designed for use as customer premises equipment.

The SAS allocates frequency bands to the CBSDs associated with the operators within particular geographical areas and, in some cases, during particular time intervals. The SAS determines whether incumbents are present within corresponding geographical areas using an environmental sensing capability (ESC) that performs incumbent detection, e.g., using radar to detect the presence of a Navy ship in a port.

The tiered access architecture provides priority access to incumbents, which include Grandfathered Wireless Broadband Licensees that are authorized to operate on a primary basis on frequencies designated in 47 CFR § 96.11. When an incumbent is present in a geographical area, the incumbent is granted exclusive access to a portion of the CBRS spectrum within the geographic area. For example, if a Navy ship enters a port, communication systems on the ship are granted exclusive access to a 20-40 MHz band within the 3550-3700 MHz band. Operators that have received a PAL and GAA are required to vacate the band allocated to the ship. A PAL license grants exclusive access to a portion of the 3550-3700 MHz band within a predetermined geographical area as long as no incumbents have been allocated an overlapping portion of the 3550-3700 MHz band within the predetermined geographical area. The GAA operators are given access to a portion of the 3550-3700 MHz band within a geographic area as long as no incumbents or PAL licensees have been allocated an overlapping portion in the same geographic area during a concurrent time interval. The GAA operators are also required to share the allocated portion of the 3550-3700 MHz band if other GAA operators are allocated the same portion.

The FCC and the National Telecommunications and Information Administration (NTIA) define protection areas that give priority to incumbents or other base stations or users. Examples of protection areas include, but are not limited to, areas associated with incumbents in a Fixed Satellite System (FSS), a grandfathered wireless protection zone (GWPZ), a region associated with a grandfathered wireless broadband license (GWBL), a region associated with a priority access license (PAL), a region associated with an ESC, and dynamic protection areas (DPAs).

The FCC and the NTIA also define a set of DPAs along the east, west, and Gulf coasts of the United States. A DPA is a pre-defined local protection area that is activated or deactivated as necessary to protect Department of Defense (DOD) radar systems. All outdoor (Category B) CBSD within an activated DPA are required to stop transmission or reduce transmission to below a threshold transmit power. One or more ESC sensors deployed within a DPA detect the presence or absence of an incumbent. In some cases, an ESC cloud gathers information from a set of ESC sensors within a DPA and uses this information to detect incumbents. An ESC sensor (or cloud) transmits a report to the SAS for the DPA in response to the ESC sensor (or cloud) detecting the presence of an incumbent. The report includes information identifying the portion (e.g., 10-20 MHz) of the total 150 MHz CBRS spectrum that is impacted by the presence of the incumbent. In response to receiving the report, the SAS performs interference management using all the CBSDs within the DPA that are operating within the impacted frequency range. For example, the SAS can move the CBSD to a different channel or instruct the CBSD to operate with a lower transmit power to keep the interference level in compliance with FCC regulations. Lowering the transmit power reduces the transmission coverage area for the CBSD. A DPA can only be deactivated by an operational ESC sensor. Thus, the SAS and the ESC sensor (or cloud) maintain a constant heartbeat exchange to verify that an operational ESC sensor is present within the DPA. If there are no operational ESC sensors deployed within a DPA, the DPA must be activated throughout the entire 150 MHz CBRS spectrum. Moreover, no outdoor CBSDs (Category B) can be deployed in a DPA without an ESC sensor.

Regional instances of the SAS operated by different vendors perform Coordinated Periodic Activities Among SASs (CPAS) every 24 hours by exchanging status information for the CBSDs that are managed by the SAS instances. The instances of the SAS use the exchanged status information to compute or update channel and power assignments for the CBSDs based on the new snapshot of the CBSDs managed by all SAS instances from all SAS administrators. Accounting to the properties of the different CBSDs allows each instance of the SAS to appropriately protect the incumbents via accurate interference calculations that are performed based on status information for all the CBSDs deployed in the geographic area. If the CBSDs in an edge cloud network fall within a DPA, the instances of the SAS compute backup channel grant lists for the CBSDs in addition to the primary channel grant. Information indicating the backup channel grant list is relayed to the local SAS instantiated by the domain proxy on the edge cloud. The local SAS stores the backup channel grant in case the incumbent appears when the regional instances of the SAS are inaccessible and the primary channel grant is impacted by the incumbent presence in the lower 100 MHz. Results obtained from CPAS are valid for a predetermined time interval such as 24-hrs.

The regional instances of the SAS do not typically account for the potential interference caused by any CBSDs that are installed after the last CPAS and before the next CPAS. Consequently, the interference calculations that were previously performed based on status information for the CBSDs that were deployed in the geographic area at the time of the previous CPAS would be invalidated if the newly installed CBSDs were allowed to begin transmission immediately. To avoid disrupting the previously installed CBSDs, the newly installed CBSDs receive a suspended grant from the SAS that includes information indicating a channel allocated to the newly installed CBSD but does not authorize the newly installed CBSD to begin providing service. Following a successful CPAS computation, the SAS converts a provisional suspended grant to a valid grant that allows the CBSD to use the assigned channel with a transmit power that is determined by the CPAS computation.

Technicians are sent into the field to install CBSDs. For example, the FCC requires certified professional installers (CPI) to perform the installation of outdoor (Category B) CBSDs and indoor (Category A) CBSDs that are deployed outside at a height above 6 meters (m). The CPI is responsible for installing the CBSD and verifying that the CBSD is operating correctly by performing a series of tests including a power check to verify that the CBSD can power up, a registration check to verify that the CBSD successfully registered with the SAS, a grant check to verify that the CBSD received a grant from the SAS, a radio grant check to verify that the CBSD is authorized for communication on the granted channel, and a walk-through check to verify that user equipment are receiving data transmitted by the CBSD. However, the walk-through check cannot be performed on a CBSD that has only received a suspended grant because the CBSD is not authorized to transmit until the suspended grant is converted to a valid grant. As discussed above, suspended grants are not converted to valid grants until after the next CPAS, which are performed at intervals of 24 hours in most cases. The CPI is therefore required to install the CBSD and then wait up to 24 hours to perform the testing phase of the installation process. Thus, the CPI would typically have to make two trips (or more if any reconfigurations are needed) out to the installation site to complete installation of the CBSD.

FIGS. 1-13 disclose embodiments of an SAS that issues a test grant in response to a registration request from a CBSD being installed in a protection area to provide a technician time to complete the testing and installation process for the CBSD. The test grant allocates a channel to the CBSD and authorizes the CBSD to transmit on this channel at the minimum power allocation for a reduced time interval such as 15 minutes or 30 minutes. The test grant is converted to a suspended grant in response to expiration of the reduced time interval. In some embodiments, a technician requests one or more additional reduced time intervals to complete the testing process after the original request expires. The suspended grant is subsequently converted to a valid grant following the next successfully completed CPAS. In some embodiments, installation and testing of the CBSD is performed according to a framework that coordinates installation and testing of multiple CBSDs by multiple CPIs. In some embodiments, the grants issued by the SAS have two states: granted and authorized. Once granted, a CBSD cannot use the allocated channel until the grant is authorized. Thus, as used herein, the term "valid grant" refers to a grant that has been granted and authorized. The term "suspended grant" refers to a grant that has been granted but not yet authorized. The term "test grant" refers to a grant that has been granted and authorized for a limited amount of time such as the reduced time interval of 15 minutes or 30 minutes.

Some embodiments of the SAS estimate an updated aggregate interference level within the DPA by combining an aggregate interference level that was computed for the previously installed CBSDs during a previous CPAS with an interference level estimated for the newly installed CBSD based on a minimum power allocation and a path loss associated with the newly installed CBSD. The SAS issues the test grant in response to the updated aggregate interference level being less than a threshold value. If the updated aggregate interference level is greater than a threshold value, the SAS issues a suspended grant to the CBSD. The reduced time interval is selected to provide the technician with sufficient time to perform testing and verification of the CBSD, e.g., to perform a walk-through check to verify that user equipment camp on the CBSD and receive data transmitted by the CBSD. Some embodiments of the SAS perform an on-demand CPAS for the newly installed CBSD to estimate aggregate interference to one or more nearby incumbents based on previously calculated interference from a subset of previously installed CBSDs and estimated interference from the newly installed CBSD. The on-demand aggregate interference is then used to determine the lowest possible power level that can be safely allocated to the CBSD for the duration of the test grant.

FIG. 1 is a block diagram of a communication system 100 according to some embodiments. The communication system 100 operates in accordance with the FCC rules set forth in 47 Code of Federal Regulations (CFR) Part 96, which allows sharing of the 3550-3700 MHz Citizens Broadband Radio Service (CBRS) between incumbents and other operators. However, some embodiments of the communication system 100 operate in accordance with other rules, standards, or protocols that support sharing of a frequency band between incumbents and other devices such that the frequency band is available for exclusive allocation to an incumbent device if the incumbent device is present in a geographic area. In that case, the other devices are required to vacate any portion of the frequency band that overlaps with another portion of the frequency band that is allocated to the incumbent device. For example, if the communication system 100 is deployed (at least in part) proximate a port and a Navy ship such as an aircraft carrier 101 arrives in the port, devices in a geographic area proximate the port that are providing wireless connectivity in a portion of the frequency band allocated to the aircraft carrier 101 are required to vacate the portion of the frequency band to provide the aircraft carrier 101 with exclusive access to the frequency band within the geographic area.

The communication system 100 includes a regional cloud 105 that provides cloud-based support for a private enterprise network 110. Some embodiments of the regional cloud 105 include one or more servers that are configured to provide operations and maintenance (O&M) management, a customer portal, network analytics, software management, and central security for the private enterprise network 110. The regional cloud 105 also includes an SAS instance 115 to allocate frequency bands to operators, e.g., to the private enterprise network 110 for CBRS within the 3550-3700 MHz band. The communication system 100 also includes another regional cloud 106 that includes an SAS instance 116. In the illustrated embodiment, the regional clouds 105, 106 are located at different geographic locations and are therefore used to provide geo-redundancy. For example, the SAS instance 115 can be selected as a primary SAS and the SAS instance 116 can be selected as a secondary, geo-redundant SAS. The SASs 115, 116 communicate with each other over an SAS-SAS interfaces (not shown in FIG. 1 in the interest of clarity). If additional SAS instances are present in the communication system 100, the SAS instances communicate with each other over corresponding SAS-SAS interfaces. The SASs 115, 116 can serve multiple private enterprise networks, although a single private enterprise network 110 is shown in FIG. 1 in the interest of clarity.

The regional clouds 105, 106 are configured via user interface portals to one or more external computers 120, only one of which is shown in FIG. 1 in the interest of clarity. For example, the external computer 120 can provide a customer user interface portal for service management, a digital automation cloud management user interface portal, and an SAS user interface portal that is used to configure the SASs 115, 116.

The private enterprise network 110 includes an edge cloud 125 that communicates with the regional clouds 105, 106 to support a plug-and-play deployment of the private enterprise network 110. Some embodiments of the edge cloud 125 support auto configuration and self-service, industrial protocols, local connectivity with low latency, LTE-based communication and local security, high availability, and other optional applications for the private enterprise network 110. In the illustrated embodiment, the edge cloud 125 implements a domain proxy 130 that provides managed access and policy control to a set of CBSDs 131, 132, 133 that are implemented using base stations, base station routers, mini-macrocells, microcells, indoor/outdoor picocells, femtocells, or other wireless devices or wireless access devices. As used herein, the term "base station" refers to any device that provides wireless connectivity in the private enterprise network 110. Some embodiments of the base station operate as a CBSD, e.g., as either category A CBSD (Indoor), Category B CBSD (outdoor), or customer premises equipment (CPE). The CBSDs 131, 132, 133 are therefore referred to herein as the base stations 131, 132, 133 and collectively as "the base stations 131-133." Some embodiments of the domain proxy 130 are implemented in one of the regional clouds 105, 106.

The domain proxy 130 mediates between the SASs 115, 116 and the base stations 131-133. In order to utilize the shared spectrum, the base stations 131-133 transmit requests towards one of the SASs 115, 116 to request allocation of a portion of a frequency band. The other one of the SASs 115, 116 is used as a secondary SAS in case of a failure associated with the primary SAS. The requests include information identifying the portion of the frequency band such as one or more channels, a geographic area corresponding to a coverage area of the requesting base station, and, in some cases, a time interval that indicates when the requested portion of the frequency band is to be used for communication. In the illustrated embodiment, the coverage area of the base stations 131-133 corresponds to the area encompassed by the private enterprise network 110. Some embodiments of the domain proxy 130 reduce the signal load between the domain proxy 130 and the SASs 115, 116 by aggregating requests from multiple base stations 131-133 into a smaller number of messages that are transmitted from the domain proxy 130 to the SASs 115, 116. The base stations 131-133 provide wireless connectivity to corresponding user equipment 135, 136, 137 (collectively referred to herein as "the user equipment 135-137") in response to the SASs 115, 116 allocating portions of the frequency band to the base stations 131-133.

The requests transmitted by the base stations 131-133 do not necessarily include the same information. Some embodiments of the requests from the base stations 131-133 include information indicating different portions of the frequency band, different geographic areas, or different time intervals. For example, the base stations 131-133 request portions of the frequency band for use in different time intervals if the private enterprise network 110 is deployed in a mall or shopping center and the base stations 131-133 are used to provide wireless connectivity within different stores that have different operating hours. The domain proxy 130 therefore manages the base stations 131-133 using separate (and potentially different) policies on a per-CBSD basis. In some embodiments, the domain proxy 130 accesses the policies for the base stations 131-133 in response to receiving a request from one of the base stations 131-133. The domain proxy 130 determines whether the requesting base station from which the request is received is permitted to access the SAS instance 115 based on the policy, e.g., by comparing information in the policy to information in one or more mandatory fields of the request. The domain proxy 130 selectively provides the requests to the SASs 115, 116 depending on whether the requesting base station is permitted to access the SASs 115, 116. If so, the request is transmitted to the SASs 115, 116 or aggregated with other requests for transmission to the SASs 115, 116. Otherwise, the request is rejected.

As discussed herein, the FCC requires certified professional installers (CPI) to perform the installation of outdoor (Category B) CBSDs and indoor (Category A) CBSDs that are deployed outside at a height above 6 meters (m). A complete installation includes testing and verification of the newly installed base station (or CBSD) while the base station is authorized to transmit (and receive) signals over one or more channels. For example, the CPI performs testing and verification on the base station 131 in response to installing the base station 131. In the illustrated embodiment, the SAS 115 (or, in other embodiments, the SAS 116) receives a registration request from the base station 131 in response to the base station 131 being installed. The SAS 115 allocates to the base station 131 a channel in the shared spectrum and a transmission power to be used by the base station 131. The SAS 115 transmits a test grant authorizing the base station 131 to transmit on the channel at the transmission power for a predetermined time interval such as 15 minutes or 30 minutes. The SAS 115 converts the test grant to a suspended grant following the predetermined time interval. In some cases, the SAS 115 receives the registration request from the base station 131 in response to the base station 131 being installed in the DPA 110.

Figure 2:
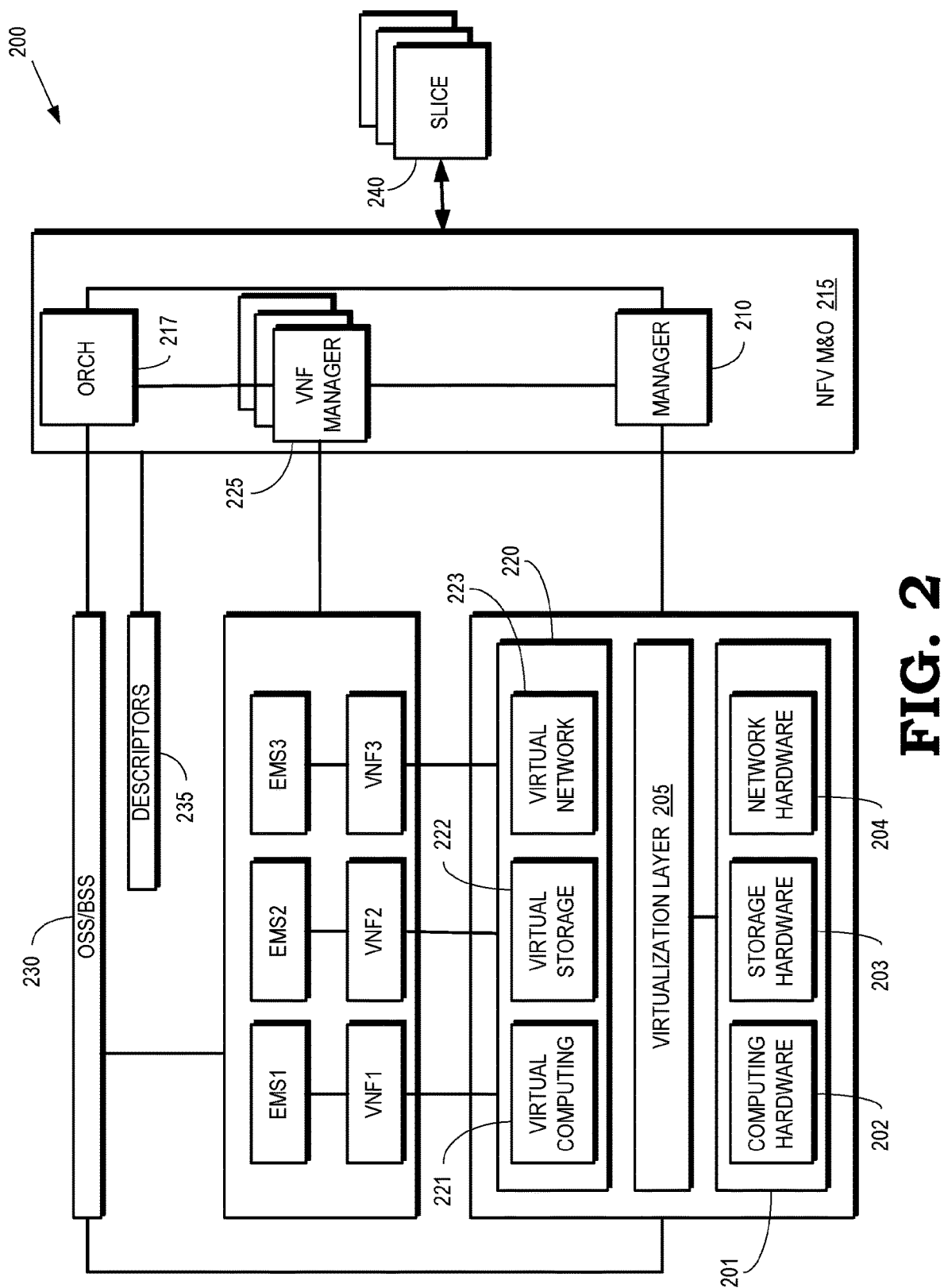
FIG. 2 is a block diagram of a network function virtualization (NFV) architecture according to some embodiments.

FIG. 2 is a block diagram of a network function virtualization (NFV) architecture 200 according to some embodiments. The NFV architecture 200 is used to implement some embodiments of the communication system 100 shown in FIG. 1. The NFV architecture 200 includes hardware resources 201 including computing hardware 202 such as one or more processors or other processing units, storage hardware 203 such as one or more memories, and network hardware 204 such as one or more transmitters, receivers, or transceivers. A virtualization layer 205 provides an abstract representation of the hardware resources 201. The abstract representation supported by the virtualization layer 205 can be managed using a virtualized infrastructure manager 210, which is part of the NFV management and orchestration (M&O) module 215. Some embodiments of the virtualized infrastructure manager 210 are configured to collect and forward performance measurements and events that may occur in the NFV architecture 200. For example, performance measurements may be forwarded to an orchestrator (ORCH) 217 implemented in the NFV M&O 215. The hardware resources 201 and the virtualization layer 205 may be used to implement virtual resources 220 including virtual computing 221, virtual storage 222, and virtual networking 223.

Virtual networking functions (VNF1, VNF2, VNF3) run over the NFV infrastructure (e.g., the hardware resources 201) and utilize the virtual resources 220. For example, the virtual networking functions (VNF1, VNF2, VNF3) are implemented using virtual machines supported by the virtual computing resources 221, virtual memory supported by the virtual storage resources 222, or virtual networks supported by the virtual network resources 223. Element management systems (EMS1, EMS2, EMS3) are responsible for managing the virtual networking functions (VNF1, VNF2, VNF3). For example, the element management systems (EMS1, EMS2, EMS3) may be responsible for fault and performance management. In some embodiments, each of the virtual networking functions (VNF1, VNF2, VNF3) is controlled by a corresponding VNF manager 225 that exchanges information and coordinates actions with the virtualized infrastructure manager 210 or the orchestrator 217.

The NFV architecture 200 may include an operation support system (OSS)/business support system (BSS) 230. The OSS/BSS 230 deals with network management including fault management using the OSS functionality. The OSS/BSS 230 also deals with customer and product management using the BSS functionality. Some embodiments of the NFV architecture 200 use a set of descriptors 235 for storing descriptions of services, virtual network functions, or infrastructure supported by the NFV architecture 200. Information in the descriptors 235 may be updated or modified by the NFV M&O 215.

The NFV architecture 200 can be used to implement network slices 240 that provide user plane or control plane functions. A network slice 240 is a complete logical network that provides communication services and network capabilities, which can vary from slice to slice. User equipment can concurrently access multiple network slices 240. Some embodiments of user equipment provide Network Slice Selection Assistance Information (NSSAI) parameters to the network to assist in selection of a slice instance for the user equipment. A single NSSAI may lead to the selection of several network slices 240. The NFV architecture 200 can also use device capabilities, subscription information and local operator policies to do the selection. An NSSAI is a collection of smaller components, Single-NSSAIs (S-NSSAI), which each include a Slice Service Type (SST) and possibly a Slice Differentiator (SD). Slice service type refers to an expected network behavior in terms of features and services (e.g., specialized for broadband or massive IoT), while the slice differentiator can help selecting among several network slice instances of the same type, e.g. to isolate traffic related to different services into different network slices 240.

Figure 3:
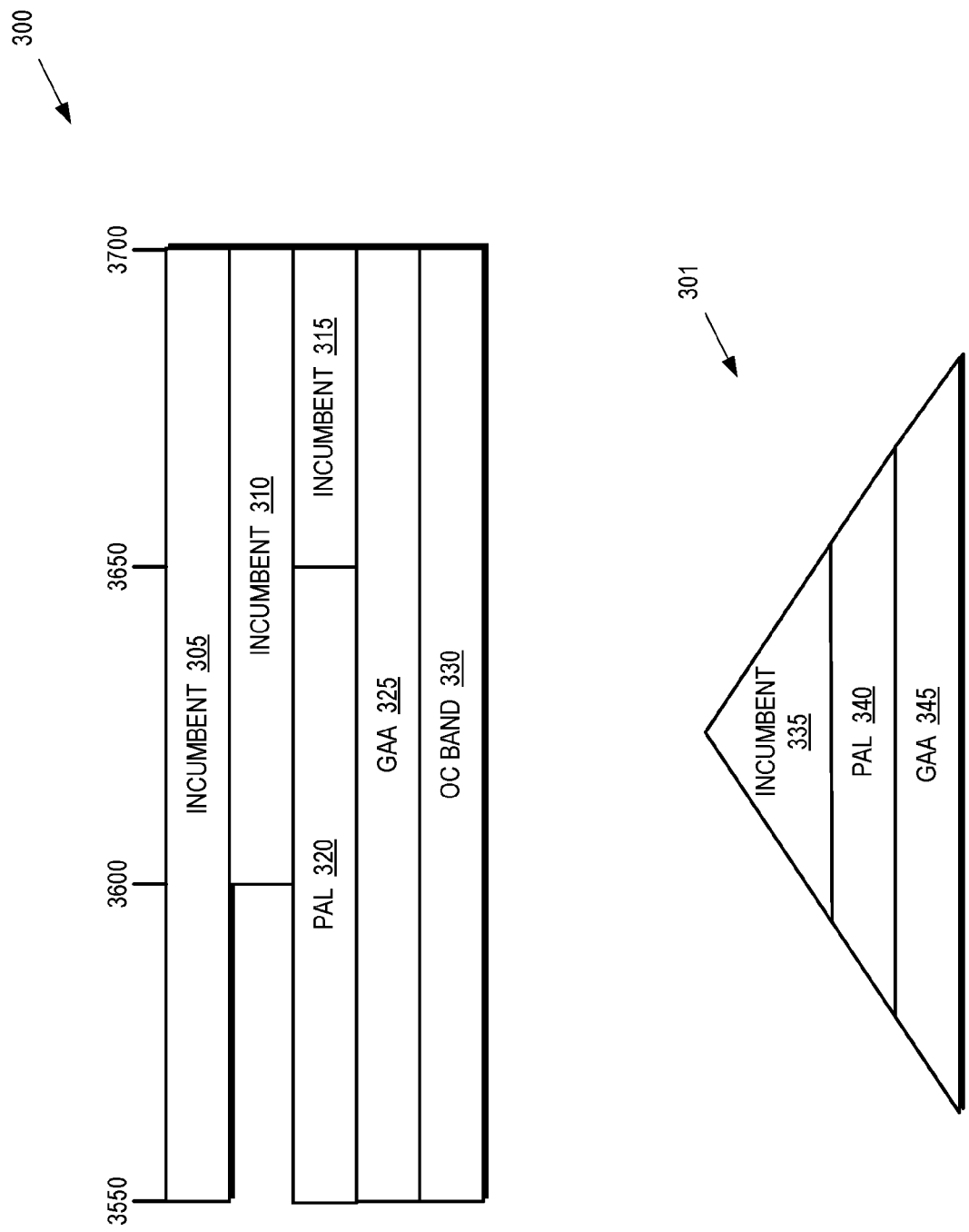
FIG. 3 is a block diagram illustrating an allocation of frequency bands and an access priority for incumbents, licensed users, and general access users according to some embodiments.

FIG. 3 is a block diagram illustrating an allocation 300 of frequency bands and an access priority 301 for incumbents, licensed users, and general access users according to some embodiments. The allocation 300 and the access priorities 301 are used to determine whether CBSDs such as the base stations 131-133 shown in FIG. 1 are given permission to establish a wireless communication links in portions of the frequency band. The frequency band extends from 3550 MHz to 3700 MHz and therefore corresponds to the spectrum allocated for CBRS. An SAS such as one of the SAS instances 115, 116 shown in FIG. 1 allocates portions of the frequency band to devices for providing wireless connectivity within a geographic area. For example, the SAS can allocate 20-40 MHz portions of the frequency band to different devices for use as communication channels.

Portions of the frequency band are allocated to incumbent federal radio location devices, such as Navy ships, from the block 305, which corresponds to all the frequencies in the available frequency band. Portions of the frequency band are allocated to incumbent FSS receive-only earth stations from the block 310. Portions of the frequency band are allocated to grandfathered incumbent wireless broadband services from the block 315. As discussed herein, the portions of the frequency band are allocated from the blocks 305, 310, 315 for exclusive use by the incumbent.

Operators that have received a priority access license (PAL) consistent with 47 CFR § 96.23, et seq. are able to request allocation of portions of the frequency band in the block 320. The portion of the frequency band that is allocated to an operator holding a PAL is available for exclusive use by the operator in the absence of any incumbents in an overlapping frequency band and geographic area. For example, the SAS can allocate a PAL channel in any portion of the entire 150 MHz of CBRS band as long as it is not pre-empted by the presence of an incumbent. Portions of the frequency band within the block 325 are available for allocation to general authorized access (GAA) operators that are authorized to implement one or more CBSDs consistent with 47 CFR § 96.33, et seq. The GAA operators provide wireless connectivity in the allocated portion in the absence of any incumbents or PAL licensees on an overlapping frequency band and geographic area. The GAA operators are also required to share the allocated portion with other GAA operators, if present. Portions of the frequency band within the block 330 are available to other users according to protocols defined by the Third Generation Partnership Project (3GPP).

The access priority 301 indicates that incumbents have the highest priority level 335. Incumbents are therefore always granted exclusive access to a request to portion of the frequency band within a corresponding geographic area. Lower priority operators are required to vacate the portion of the frequency band allocated to the incumbents within the geographic area. The access priority 301 indicates that PAL licensees have the next highest priority level 340, which indicates that PAL licensees receive exclusive access to an allocated portion of the frequency band in the absence of any incumbents. The PAL licensees are also entitled to protection from other PAL licensees within defined temporal, geographic, and frequency limits of their PAL. The GAA operators (and, in some cases, operators using other 3GPP protocols) received the lowest priority level 345. The GAA operators are therefore required to vacate portions of the frequency band that overlap with portions of the frequency band allocated to either incumbents or PAL licensees within an overlapping geographic area.

Figure 4:
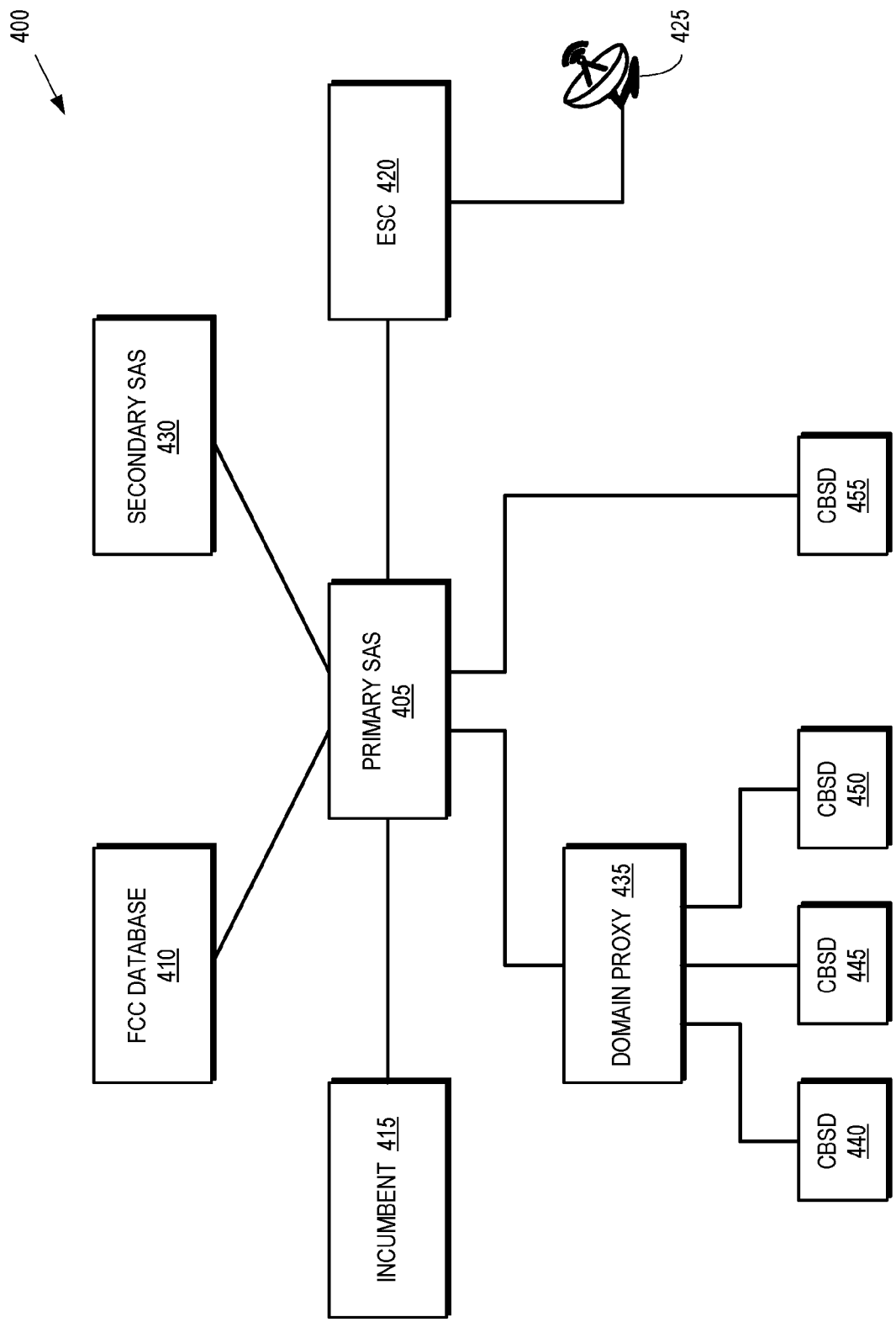
FIG. 4 is a block diagram of a communication system that implements tiered spectrum access according to some embodiments.

FIG. 4 is a block diagram of a communication system 400 that implements tiered spectrum access according to some embodiments. In the illustrated embodiment, the communication system 400 implements tiered spectrum access in the 3550-3700 CBRS band via a WInnForum architecture. The communication system 400 includes an SAS instance 405 that performs operations including incumbent interference determination and channel assignment, e.g., for CBRS channels shown in FIG. 3. In the illustrated embodiment, the SAS instance 405 is selected as a primary SAS. An FCC database 410 stores a table of frequency allocations that indicate frequencies allocated to incumbent users and PAL licensees. An informing incumbent 415 provides information indicating the presence of the incumbent (e.g., a coverage area associated with the incumbent, and allocated frequency range, a time interval, and the like) to the SAS instance 405. The SAS instance 405 allocates other portions of the frequency range to provide exclusive access to the informing incumbent 415 within the coverage area. An environmental sensing capability (ESC) 420 performs incumbent detection to identify incumbents using a portion of a frequency range within the geographic area, e.g., using a radar sensing apparatus 425. Some embodiments of the SAS instance 405 are connected to other SAS instance 430, e.g., a secondary SAS instance 430. The primary and secondary SAS instance 405, 430 are connected via corresponding interfaces so that the SAS instance 405, 430 coordinate allocation of portions of the frequency range in geographic areas or time intervals.

A domain proxy 435 mediates communication between the SAS instance 405 and one or more CBSDs 440, 445, 450 via corresponding interfaces. The domain proxy 435 receives channel access requests from the CBSDs 440, 445, 450 and verifies that the CBSDs 440, 445, 450 are permitted to request channel allocations from the SAS instance 405. The domain proxy 435 forwards requests from the permitted CBSDs 440, 445, 450 to the SAS instance 405. In some embodiments, the domain proxy 435 aggregates the requests from the permitted CBSDs 440, 445, 450 before providing the aggregated request to the SAS instance 405. The domain proxy 435 aggregates requests based on an aggregation function that is a combination of two parameters: (1) a maximum number of requests that can be aggregated into a single message and (2) a maximum wait duration for arrival of requests that are to be aggregated into a single message. For example, if the wait duration is set to 300 ms and the maximum number of requests is 500, the domain proxy accumulates receive requests until the wait duration reaches 300 ms or the number of accumulated requests which is 500, whichever comes first. If only a single request arrives within the 300 ms wait duration, the "aggregated" message includes a single request.

Thus, from the perspective of the SAS instance 405, the domain proxy 435 operates as a single entity that hides or abstracts presence of the multiple CBSDs 440, 445, 450 and conveys communications between the SAS instance 405 and the CBSDs 440, 445, 450. One or more CBSD 455 (only one shown in the interest of clarity) are connected directly to the SAS instance 405 and can therefore transmit channel access requests directly to the SAS instance 405. Additional discussion of this architecture is provided in Appendix B, from the Wireless Innovation Forum, entitled "Requirements for Commercial Operation in the U.S. 3550-3700 MHz Citizens Broadband Radio Service Band", Working Document WINNF-TS-0112, Version V1.4.130, Jan. 16, 2018, which is incorporated by reference herein in its entirety.

Figure 5:
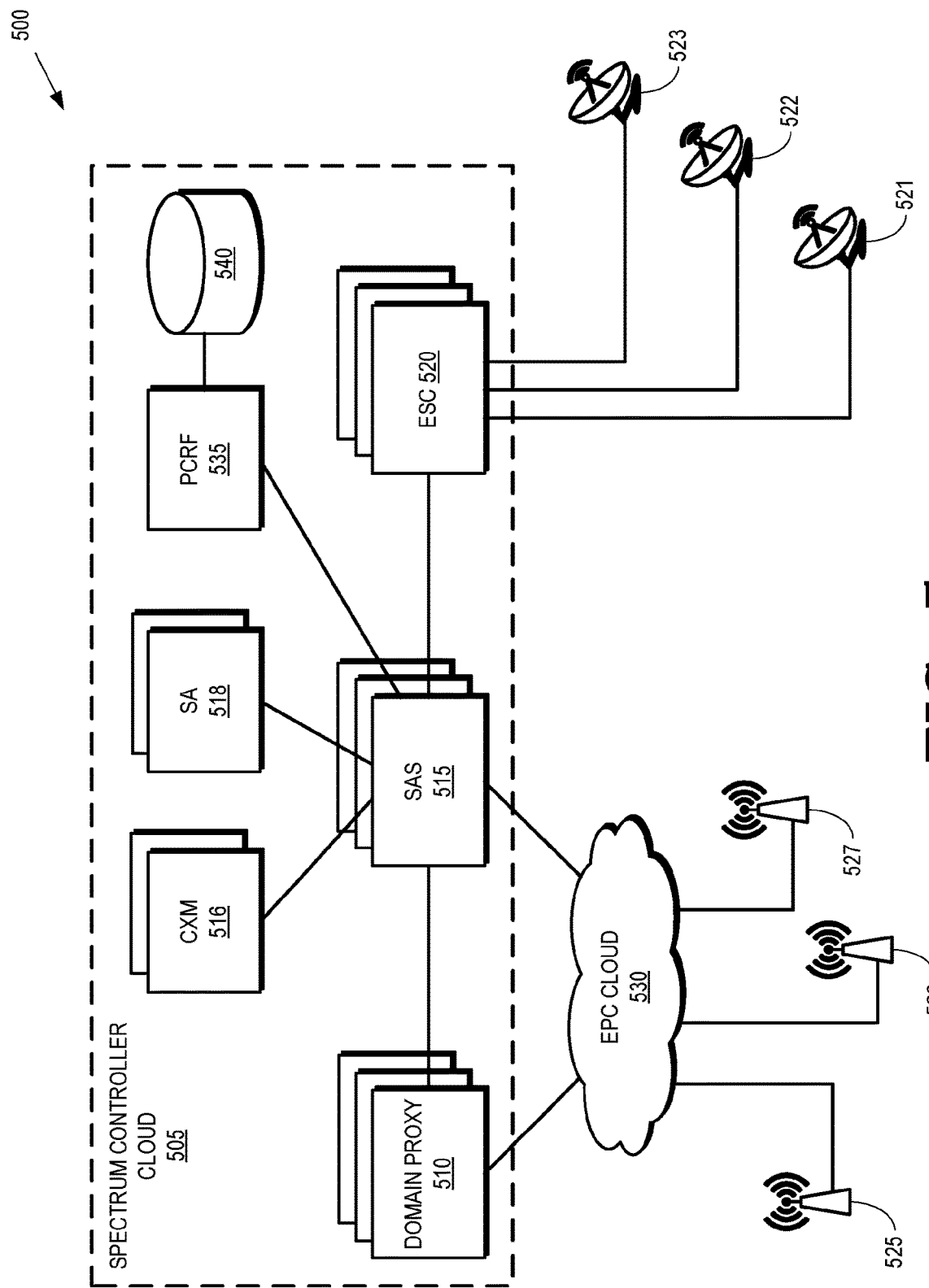
FIG. 5 is a block diagram of a communication system that implements a spectrum controller cloud to support deployment of private enterprise networks in a shared spectrum according to some embodiments.

FIG. 5 is a block diagram of a communication system 500 that implements a spectrum controller cloud 505 to support deployment of private enterprise networks in a shared spectrum according to some embodiments. The spectrum controller cloud 505 instantiates multiple instances of domain proxies 510 that support one or more private enterprise networks. The spectrum controller cloud 505 also instantiates multiple SAS instances 515 that support one or more private enterprise networks. Although not shown in FIG. 5, the SAS instances 515 can be connected to other SAS instances, e.g., in other clouds, via corresponding interfaces. Coexistence management (CXM) functions 516 and spectrum analytics (SA) functions 518 are also instantiated in the spectrum controller cloud 505.

One or more ESC instances 520 are instantiated and used to detect the presence of incumbents. In the illustrated embodiment, standalone ESC sensors 521, 522, 523 (collectively referred to herein as "the sensors 521-523") are used to monitor a frequency band to detect the presence of an incumbent such as a Navy ship. The ESC instances 520 notify the corresponding instance of the SAS instance 515 in response to detecting the presence of an incumbent in a corresponding geographic area. The SAS instance 515 is then able to instruct non-incumbent devices that serve the geographic area to vacate portions of the spectrum overlapping with the spectrum allocated to the incumbent, e.g., by defining a DPA. As discussed herein, some embodiments of the SAS instance 515 register with an ESC cloud to provide ESC services for the SAS instance 515 (or an SAS administrator for the SAS instance 515). Thus, although FIG. 5 depicts the SAS instance 515 and the ESC instances 520 as part of the same spectrum controller cloud 505, the ESC instances 520 are not necessarily deployed in the same location or controlled by the same vendor or provider as the SAS instances 515.

One or more base stations 525, 526, 527 (collectively referred to herein as "the base stations 525-527") in a private enterprise network communicate with one or more of the domain proxies 510 and the SAS instances 515 via an evolved packet core (EPC) cloud 530. The base stations 525-527 have different operating characteristics. For example, the base station 525 operates according to a PAL in the 3.5 GHz frequency band, the base station 526 operates according to GAA in the 3.5 GHz frequency band, and the base station 527 operates according to a PAL and GAA in the 3.5 GHz frequency band. The base stations 525-527 are configured as Category A (indoor operation with a maximum power of 30 dBm), Category B (outdoor operation with a maximum power of 47 dBm), or CPE. However, in other embodiments, one or more of the base stations 525-527 are configured as either Category A, Category B, or CPE. The EPC cloud 530 provides functionality including LTE EPC operation support system (OSS) functionality, analytics such as traffic analytics used to determine latencies, and the like.

The spectrum controller cloud 505 also includes a policy control and rules function (PCRF) 535 that creates policy rules and makes policy decisions for network subscribers in real-time. The PCRF 535 supports service data flow detection, policy enforcement, and flow-based charging. Some embodiments of the PCRF 535 determine the policy and charging records for SAS service to the CBRS RAN providers who sign up to receive the SAS service. Policies created or accessed by the PCRF 535 for network subscribers are stored in a corresponding database 540 in records associated with the different subscribers.

Figure 6:
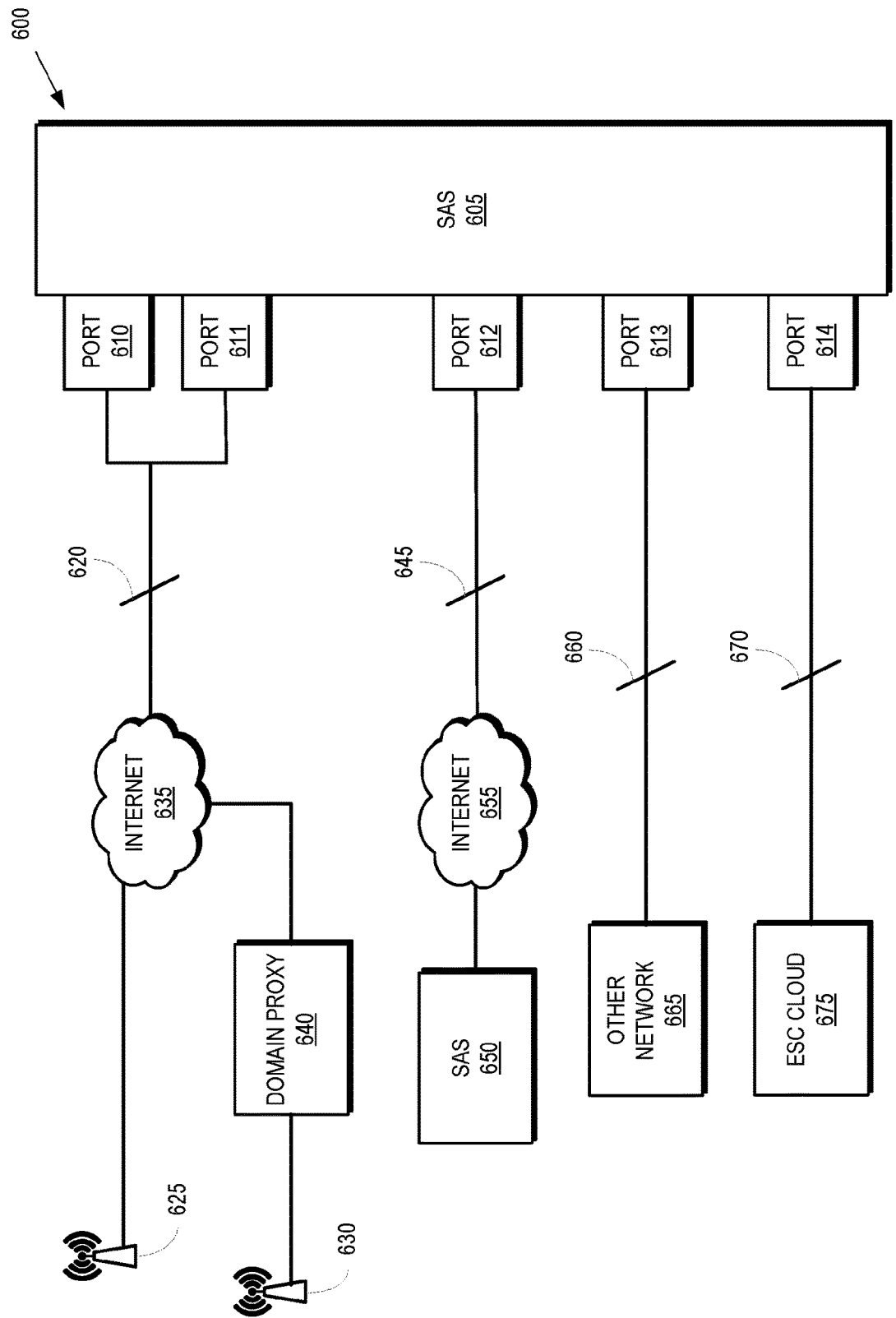
FIG. 6 is a block diagram of communication system including interfaces between Citizens Broadband radio Service Devices (CBSDs) and a spectrum access system (SAS) instance according to some embodiments.

FIG. 6 is a block diagram of communication system 600 including interfaces between CBSDs and an SAS instance 605 according to some embodiments. The SAS instance 605 is used to implement some embodiments of the SAS instance 115 shown in FIG. 1, the SAS instance 405, 430 shown in FIG. 4, and the instances of the SAS instance 515 shown in FIG. 5. The SAS instance 605 includes ports 610, 611, 612, 613, 614 (collectively referred to herein as "the ports 610-614") that provide access to the SAS instance 605.

An interface 620 supports communication between the SAS instance 605 and CBSDs 625, 630 via a network such as the Internet 635 and the ports 610, 611. The CBSD 625 is connected directly to the SAS instance 605 via the interface 620. The CBSD 630 is connected to the SAS instance 605 via a domain proxy 640 that is connected to the SAS instance 605 by the interface 620. The domain proxy 640 corresponds to some embodiments of the domain proxy 130 shown in FIG. 1, the domain proxy 435 shown in FIG. 4, and the instances of the domain proxy 510 shown in FIG. 5. An interface 645 supports communication between the SAS instance 605 and one or more other SAS instances 650 (only one shown in FIG. 6 in the interest of clarity) via a network such as the Internet 655 and the port 612. The SAS instance 650 can be owned and operated by other providers. An interface 660 supports communication between the SAS instance 605 and one or more other networks 665 (only one shown in FIG. 6 in the interest of clarity) via the port 613. An interface 670 supports communication between the SAS instance 605 and an ESC cloud 675 that provides ESC services to the SAS instance 605, e.g., within a DPA associated with the SAS instance 605.

Figure 7:
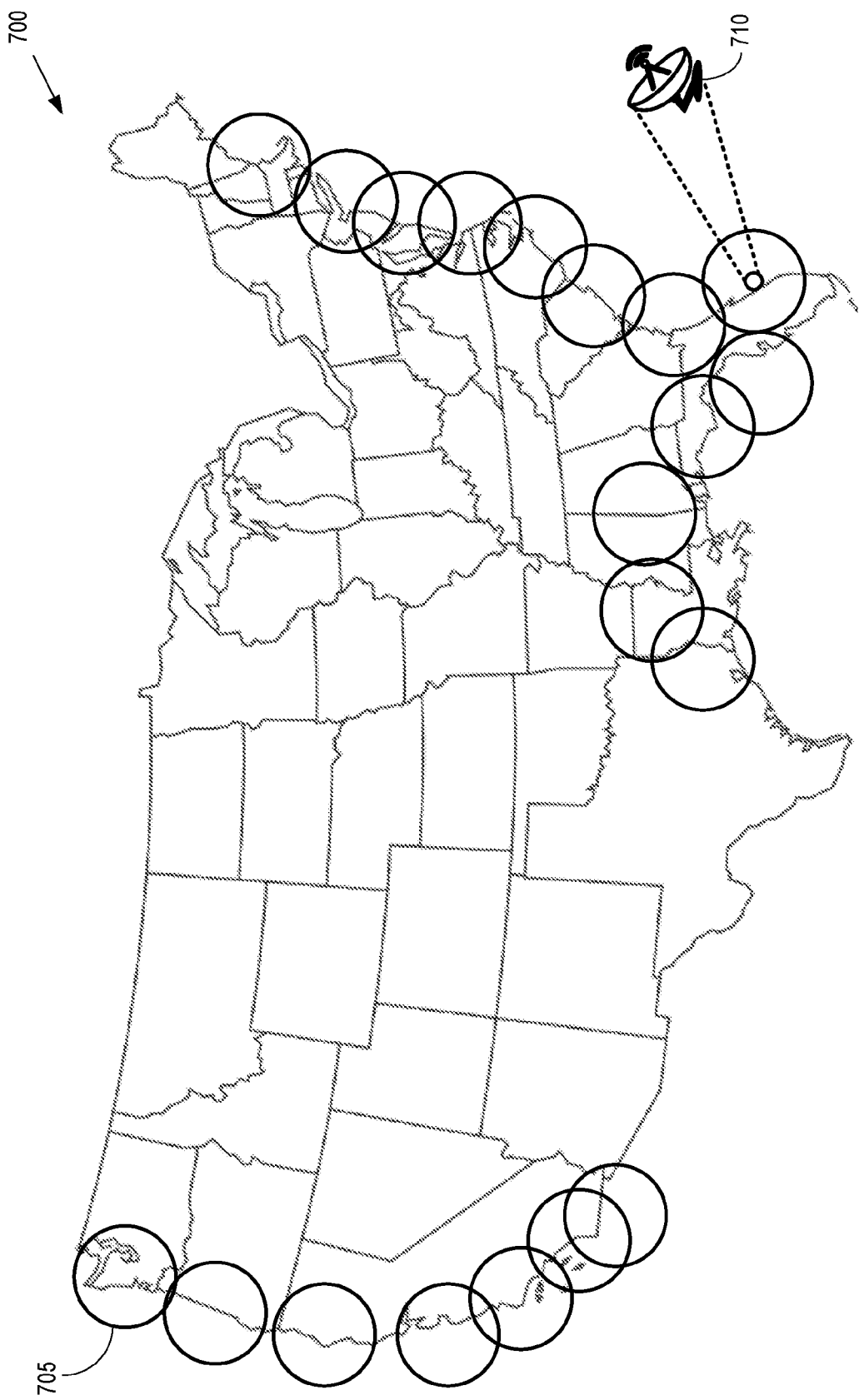
FIG. 7 is a map of the borders of the United States that illustrates a set of dynamic protection areas (DPAs) defined at different geographic locations within the United States according to some embodiments.

FIG. 7 is a map 700 of the borders of the United States that illustrates a set of DPAs defined at different geographic locations within the United States according to some embodiments. The DPAs 705 (only one indicated by a reference numeral in the interest of clarity) are typically, but not necessarily, defined near coastal regions to protect incumbents such as Navy ships. A DPA 705 can only be deactivated by an operational ESC sensor and consequently any communication system that uses the CBRS spectrum must include an ESC sensor, such as the ESC sensor 710, to have full access to the CBRS spectrum. Each ESC sensor 710 is also required to maintain an exchange of heartbeat messages with the ESC cloud that in turn connects with one or more SAS instances to verify that the ESC sensors 710 within the DPA 705 are operational. If there are no operational ESC sensors deployed within a DPA, FCC rules require that the DPA must be activated throughout the entire 150 MHz CBRS spectrum. Moreover, no outdoor CBSDs (Category B) can be deployed in a DPA 705 without an ESC sensor 710 in the DPA 705.

Figure 8:
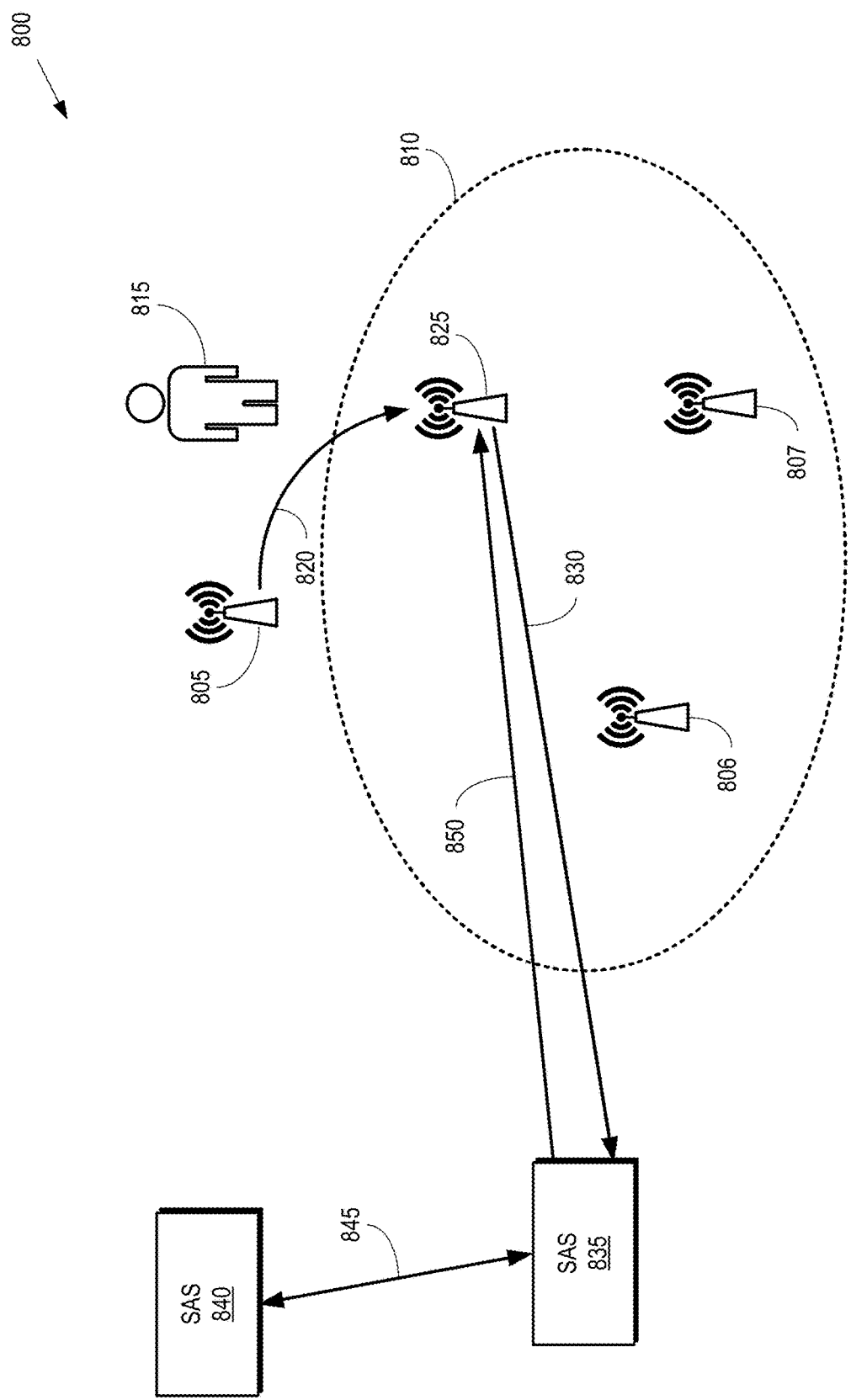
FIG. 8 is a block diagram of a communication system that includes an uninstalled CBSD that is newly installed in a DPA according to some embodiments.

FIG. 8 is a block diagram of a communication system 800 that includes an uninstalled CBSD 805 that is to be installed in a DPA 810 according to some embodiments. The communication system 800 represents some embodiments of the communication system 100 shown in FIG. 1. The communication system 800 also includes other, previously installed CBSDs 806, 807 located within the DPA 810.

Initially, the CBSD 805 is not installed for operation within the DPA 810, as indicated by the CBSD 805 being located outside of the DPA 810. A technician 815 such as a verified CPI is tasked with installing the CBSD 805. The technician 815 installs the previously uninstalled CBSD 805 at a location within the DPA 810, as indicated by the arrow 820. The uninstalled CBSD 805 and the installed CBSD 825 are given different reference numerals in FIG. 8 to indicate their different installation statuses but it should be appreciated that substantially the same physical apparatus is indicated by the uninstalled CBSD 805 and the installed CBSD 825. After installation, the technician 815 provides information indicating the installation parameters of the installed CBSD 825. The installation parameters include, but are not limited to, a latitude and a longitude indicating a location of the installed CBSD 825, a height of the installed CBSD 825, a horizontal accuracy, a vertical accuracy, an effective isotropic radiated power (EIRP) capability (dBm/10 MHz), an antenna azimuth, an antenna down tilt, an antenna gain, an antenna beamwidth, an antenna model, and the like.

The CBSD 825 transmits a registration request 830 to an SAS 835 that coordinates operation of CBSDs including the CBSDs 806, 807, e.g., by granting access, allocating frequency bands, determining transmission powers, and the like. The registration request 830 includes information indicating a request for a grant of access to utilize the shared spectrum on a channel and at a power determined by the SAS 835. The SAS 835 determines whether the CBSD 825 is being deployed within the DPA 805 based on latitude and longitude information for the CBSD 825. In response to registration of the CBSD 825, the SAS 835 can, in some circumstances, issue a provisional suspended grant that allocates a channel to the CBSD 825 but does not authorize the CBSD 825 to begin communication operations including transmission of signals over the channel. In that case, the SAS 835 does not authorize the CBSD 825 to perform communications until a subsequent CPAS computation has been performed by the SAS 835 to determine the aggregate interference level to incumbents. In some embodiments, the CPAS computation is performed based on information exchanged between the SAS 835 and one or more other SAS instances 840 over corresponding interfaces 845. The CPAS computation determines interference caused by CBSDs 806, 807, 825 that are deployed within the DPA 810 and managed by the SAS 835 or one or more other SAS instances 840. In response to completing the CPAS computation, the suspended grant is converted to a valid grant with an assigned power level that is used by the CBSD 825 to bring up the cellular carrier on the assigned channel.

However, as discussed herein, the delay between installation of the CBSD 825 by the technician 815 and the subsequent CPAS computation potentially requires a second site visit by the technician 815. Thus, instead of immediately issuing a suspended grant, the SAS 835 responds to the registration request 830 with a temporary low power shorter time duration test grant 850 that authorizes the CBSD 825 for transmission on a channel at the lower power for the shorter time duration. In some embodiments, the technician 815 requests the test grant 850 for the CBSD 825 by causing the CBSD 825 to transmit a request or by communicating with the CBSD 825 via another interface such as a web-based tool.

Some embodiments of the SAS 835 determine whether to grant the request for the test grant 850 based on an estimate of the interference produced by the previously installed CBSDs 806, 807 and the newly installed CBSD 825. In some embodiments, the SAS 835 determines or accesses an aggregate interference level that was previously computed for the CBSDs 806, 807 and any other CBSDs that are under the control of the SAS 840 to protect the incumbent. The SAS 845 then determines the additional interference contribution by the newly installed CBSD 825 using a power level and a path loss calculated for the deployed CBSD based on the installation parameters provided by the technician 815. The SAS 845 combines the previously calculated aggregate interference with the additional interference contribution to determine an updated aggregate interference. If the updated aggregate interference value remains below a threshold that is required to protect the incumbent, the SAS 845 issues the test grant 850 to the CBSD 825 with the power level. Some embodiments of the SAS 845 are allocated a fraction of a 1 dB margin (distributed equally among all SAS admins) that is available when calculating interference during CPAS. The SAS 845 therefore determines whether to issue a test grant before CPAS based in part on the fraction of the 1 dB margin.

The test grant 850 remains valid for a duration that is an order of magnitude (or more) lower than the duration of a conventional valid grant issued by the SAS 845. For example, the duration of a conventional valid grant is typically 24 hours and the duration of the test grant is 15 minutes or 30 minutes in some embodiments. The duration of the test grant 850 provides sufficient time to allow the CPI to perform the on-the-air testing of CBSD 825 to ensure that user equipment camp on the cellular carrier transmitted by the CBSD 825 and receive signals from the CBSD 825.

Some embodiments of the SAS 835 provide additional test grants to extend the duration of the testing time interval available to the technician 815. For example, if the technician 815 fails to complete the on-the-air testing of the CBSD 825 within the validity period of the test grant 850, e.g., after expiration of the test grant 850, the CBSD 825 asynchronously transmits a refresh request to the SAS 835 to issue another test grant.

This process can be iterated a predetermined number of times before the SAS 835 determines that the testing process has failed and does not issue any further test grants. Once the technician 815 completes the installation process, the CBSD state is changed to "Installed" and the SAS 835 converts the test grant to a suspended grant, which is in turn converted to a valid grant in response to subsequent performance of a CPAS procedure. The technician 815 is therefore able to complete the installation of the CBSD 825 within the DPA 805 in a single site visit instead of returning the next day to complete the on-the-air testing after the subsequent CPAS computation has been performed.

Figure 9:
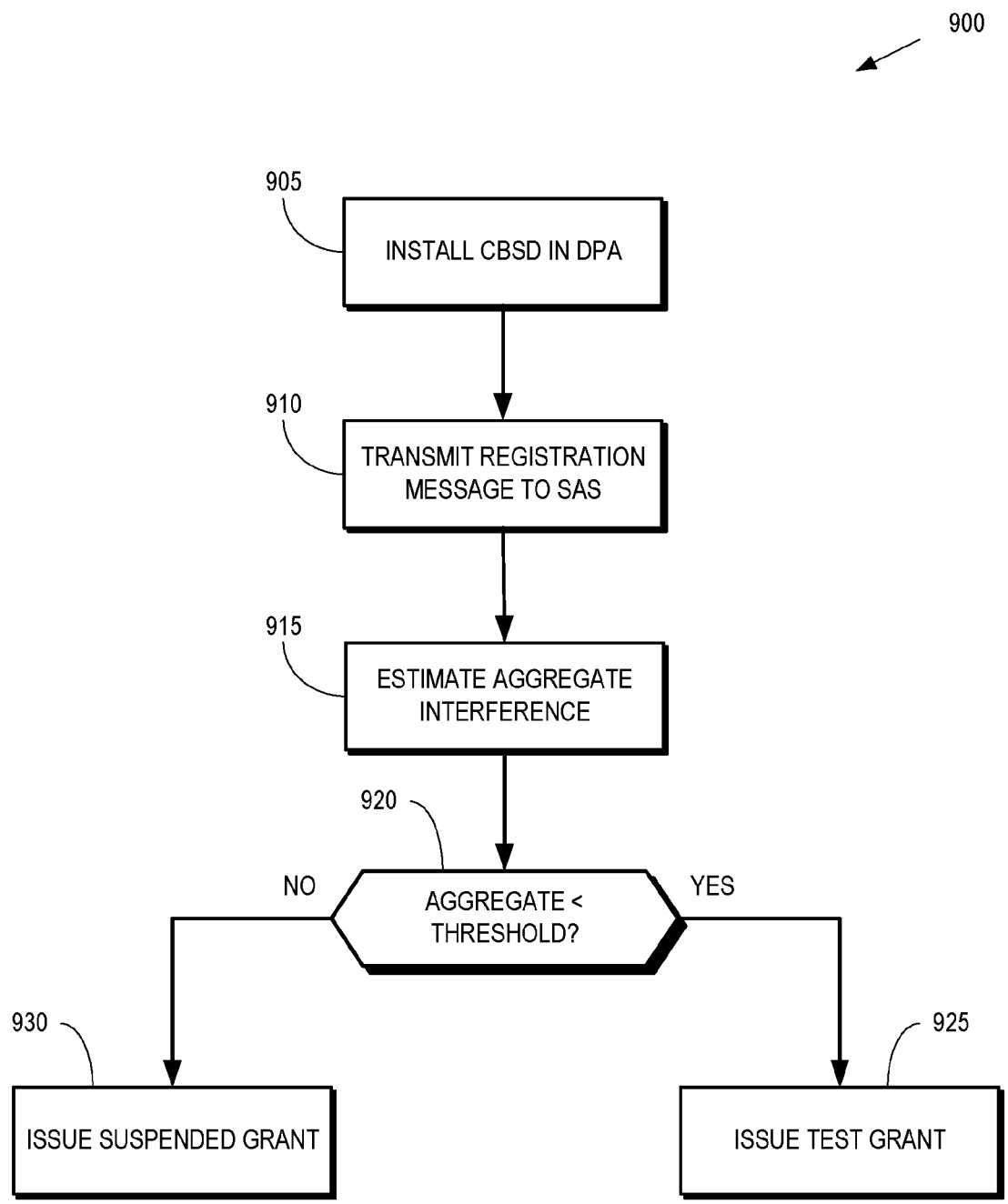
FIG. 9 is a flow diagram of a method of determining whether to issue a test grant to a newly installed CBSD according to some embodiments.

FIG. 9 is a flow diagram of a method 900 of determining whether to issue a test grant to a newly installed CBSD according to some embodiments. The method 900 is implemented in some embodiments of the SAS 115, 116 shown in FIG. 1, the primary SAS 405 shown in FIG. 4, the SAS 515 shown in FIG. 5, the SAS 605 shown in FIG. 6, and the SAS 835, 840 shown in FIG. 8. Installation of the CBSD is performed by a technician such as a CPI. In some embodiments, a set of technicians are associated with the CPI master account that manages accounts for the other technicians. The technicians are granted certificates in response to passing an associated certification course. In some cases, the certificates include (or are associated with) private keys that are used to verify data signed by the technicians, e.g., using a corresponding public key.

At block 905, a technician installs a CBSD in a DPA. For example, the technician can install the CBSD as discussed herein in FIG. 8. In response to being installed, the CBSD transmits (at block 910) a registration message to an associated SAS. The registration message includes, or is associated with, a request for a test grant that allows the technician to test and verify operation of the newly installed CBSD.

At block 915, the SAS estimates an aggregate interference for the newly installed CBSD in combination with any previously installed CBSDs. As discussed herein, the aggregate interference is estimated by combining a previous estimate of the aggregate interference (e.g., as determined during the previous CPAS) with an interference level determined for the newly installed CBSD. The SAS determines the "safest" channel that supports the test grant at the lowest possible power allocation. For example, if the CBSD falls in an exclusion zone that contains a GWPZ, the SAS can temporarily use a "GWPZ coordinated flag set" setting and a lowest power allocation to enable a short duration test grant. In some embodiments, the SAS performs an on-demand CPAS for the newly installed CBSD to estimate aggregate interference to one or more nearby incumbents based on previously calculated interference from a subset of previously installed CBSDs and estimated interference from the newly installed CBSD.

At decision block 920, the SAS compares the estimated aggregate interference to a threshold. If the estimated aggregate interference is less than or equal to the threshold, the method 900 flows to block 925 and the SAS issues the test grant for the predetermined duration, e.g., 15 minutes or 30 minutes. If the estimated aggregate interference is greater than the threshold, the method 900 flows to block 930 and the SAS declines to issue the test grant. Instead, the SAS issues a suspended grant at block 930.

Figure 10:
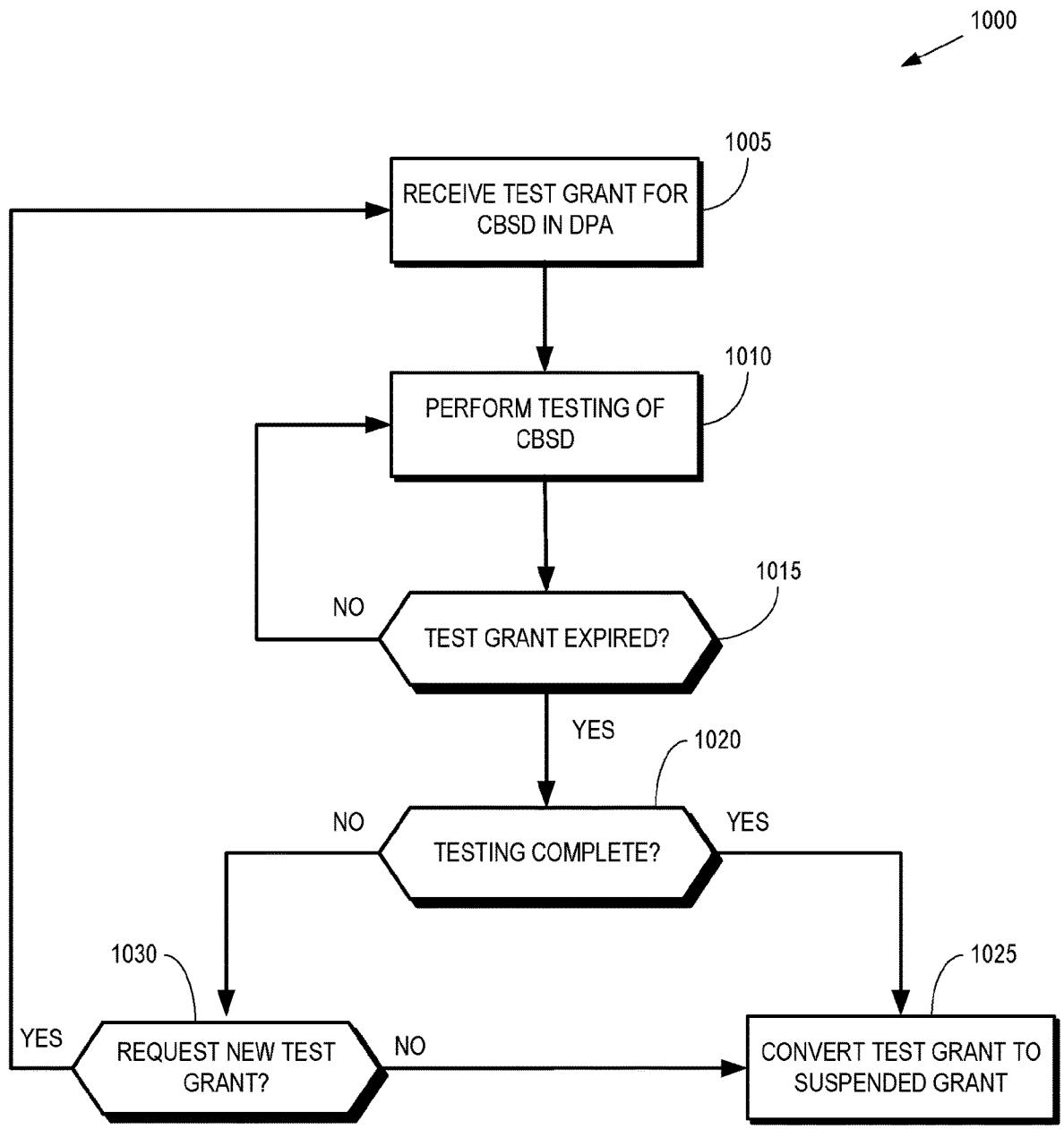
FIG. 10 is a flow diagram of a method of testing and verifying operation of a newly installed CBSD during a time interval provided by a test grant according to some embodiments.

FIG. 10 is a flow diagram of a method 1000 of testing and verifying operation of a newly installed CBSD during a time interval provided by a test grant according to some embodiments. The method 1000 is implemented in some embodiments of the SAS 115, 116 shown in FIG. 1, the primary SAS 405 shown in FIG. 4, the SAS 515 shown in FIG. 5, the SAS 605 shown in FIG. 6, and the SAS 835, 840 shown in FIG. 8.

At block 1005, a CBSD located in a DPA receives a test grant that indicates a transmission power, a channel grant, and a predetermined time interval that determines the duration of the test grant. At block 1010, a technician performs testing of the CBSD such as a walk-through check to verify that user equipment camp on the CBSD and receive data transmitted by the CBSD.

At decision block 1015, the SAS for the CBSD determines whether the test grant has expired. As long as the test grant has not expired, the technician can continue to perform testing and verification of the CBSD at block 1010. In response to the test grant expiring, the method 1000 flows to the decision block 1020.

At decision block 1020, the SAS determines whether testing is complete. If so, the method 1000 flows to block 1025 and the test grant is converted to a suspended grant. If not, the method 1000 flows to decision block 1030.

At decision block 1030, the SAS determines whether the technician has requested a new test grant. If so, and the SAS grants the request, the method 1000 flows back to block 1005. Otherwise, the method 1000 flows to block 1025 and the test grant is converted to a suspended grant.

Figure 11:
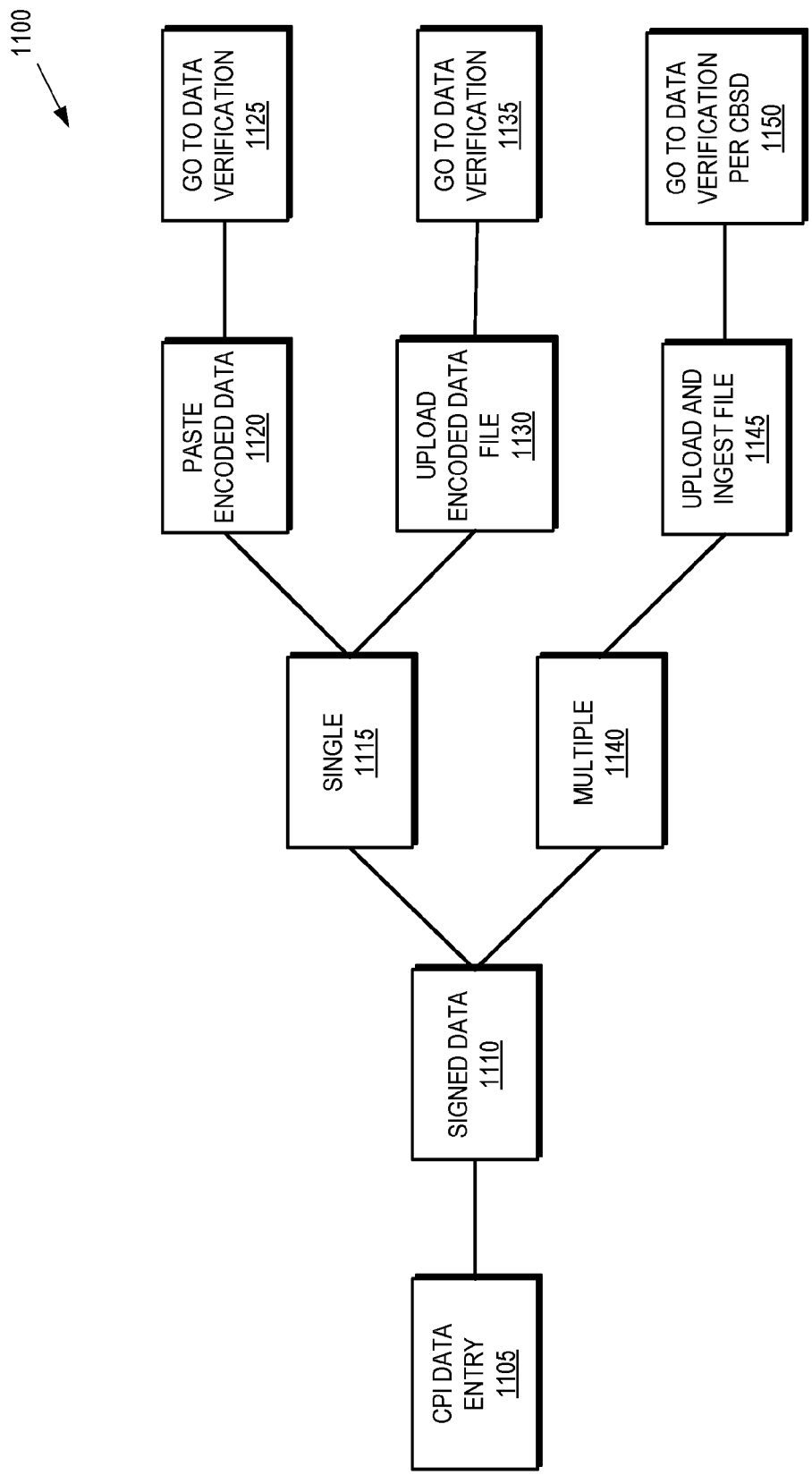
FIG. 11 is a block diagram illustrating data entry process performed by a technician such as a certified professional installer (CPI) according to some embodiments.

FIG. 11 is a block diagram illustrating data entry process 1100 performed by a technician such as a CPI according to some embodiments. The data entry process 1100 is performed by the technician while installing CBSDs.

The technician enters data at block 1105. In some embodiments, the data is entered via a web interface that is filled out by the technician while installing the CBSD. The technician then signs the data (at block 1110) using a private key that is provided to the technician in response to the technician being certified as an installer. The signature object is a binary file generated by a processing system used by the technician. The signed data is then provided to an SAS, which can process and store the signed data.

If the data is for a single CBSD, the data entry process 1100 flows to block 1115 and the technician pastes the encoded data into an appropriate form for provision to the SAS, which performs data verification at block 1120. For example, the SAS can use a public key corresponding to the private key assigned to the technician to verify the signed data. Alternatively, the encoded data file for the single CBSD is uploaded (at block 1125) to the SAS, which performs (at block 1130) data verification, e.g., using a public key corresponding to the private key assigned to the technician.

If the data is for multiple CBSDs, the data entry process 1100 flows to block 1140. A file including the encoded data for the multiple CBSDs is then uploaded and ingested by the SAS at block 1145. For example, the SAS can translate an Excel file including the encoded data into a corresponding internal database. The SAS then performs (at block 1150) data verification, e.g., using a public corresponding to the private key assigned to the technician.

Figure 12:
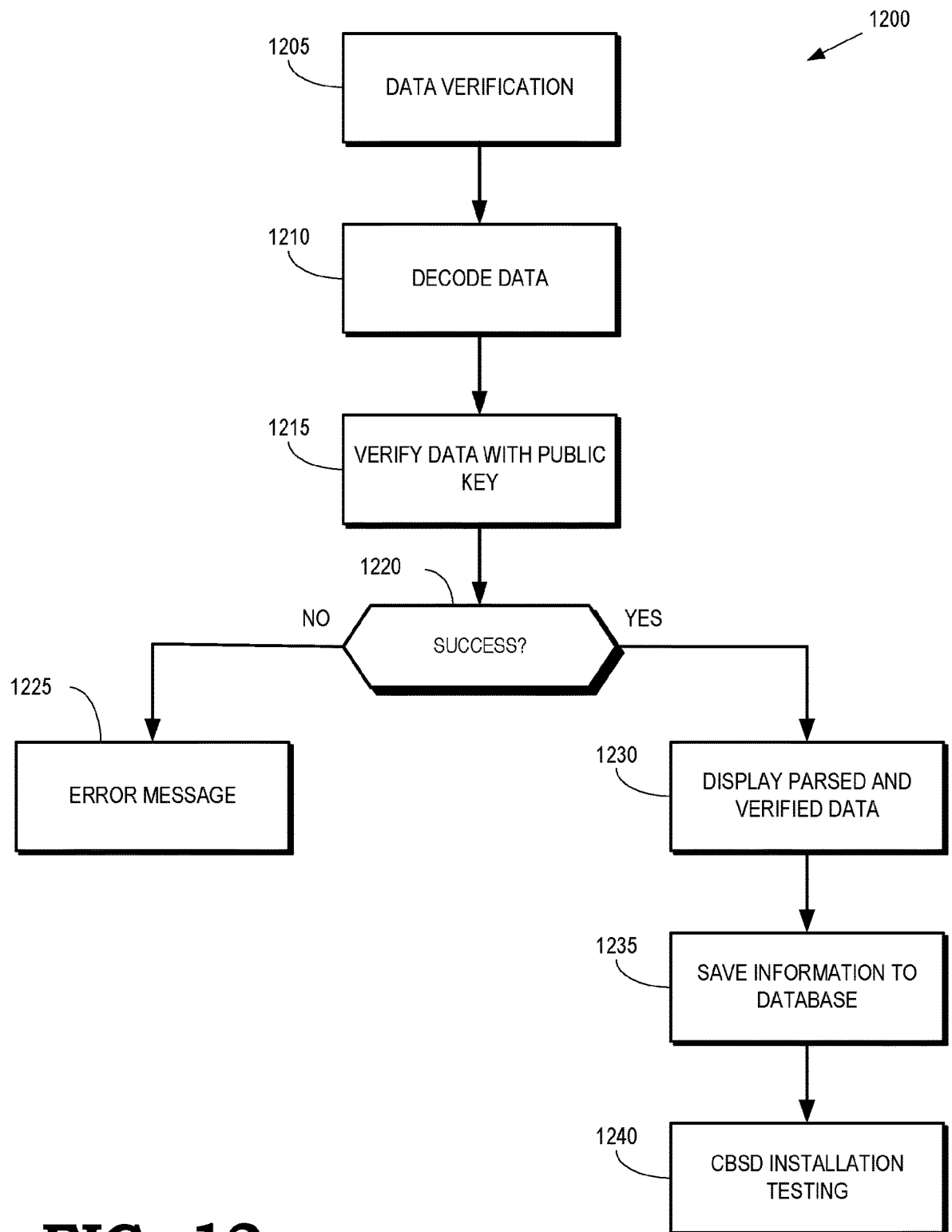
FIG. 12 is a flow diagram of a method of data verification performed by a technician such as a CPI according to some embodiments.

FIG. 12 is a flow diagram of a method 1200 of data verification performed by a technician such as a CPI according to some embodiments. The method 1200 is performed by an SAS in response to a technician installing one or more CBSDs. The method 1200 is implemented in some embodiments of the SAS 115, 116 shown in FIG. 1, the primary SAS 405 shown in FIG. 4, the SAS 515 shown in FIG. 5, the SAS 605 shown in FIG. 6, and the SAS 835, 840 shown in FIG. 8. At block 1205, the SAS begins verifying data provided by a technician, e.g., as discussed above with regard to the data entry process 1100 shown in FIG. 11. At block 1210, the SAS decode the data received from the technician via an appropriate interface. At block 1215, the SAS verifies the data using a public key that is associated with a private key that the technician uses to sign the provided data. At decision block 1220, the SAS determines whether the verification is successful. If not, the method 1200 flows to block 1225 and an error message is generated. If the verification is successful, the method 1200 flows to block 1230.

At block 1230, the SAS displays the parsed and verified data that was received from the technician in response to installing the one or more CBSDs. At block 1235, the SAS saves the information received from the technician in a database. At block 1240, the SAS authorizes the technician to begin installation testing of the one or more CBSDs in response to successfully verifying and storing the received information.

Figure 13:
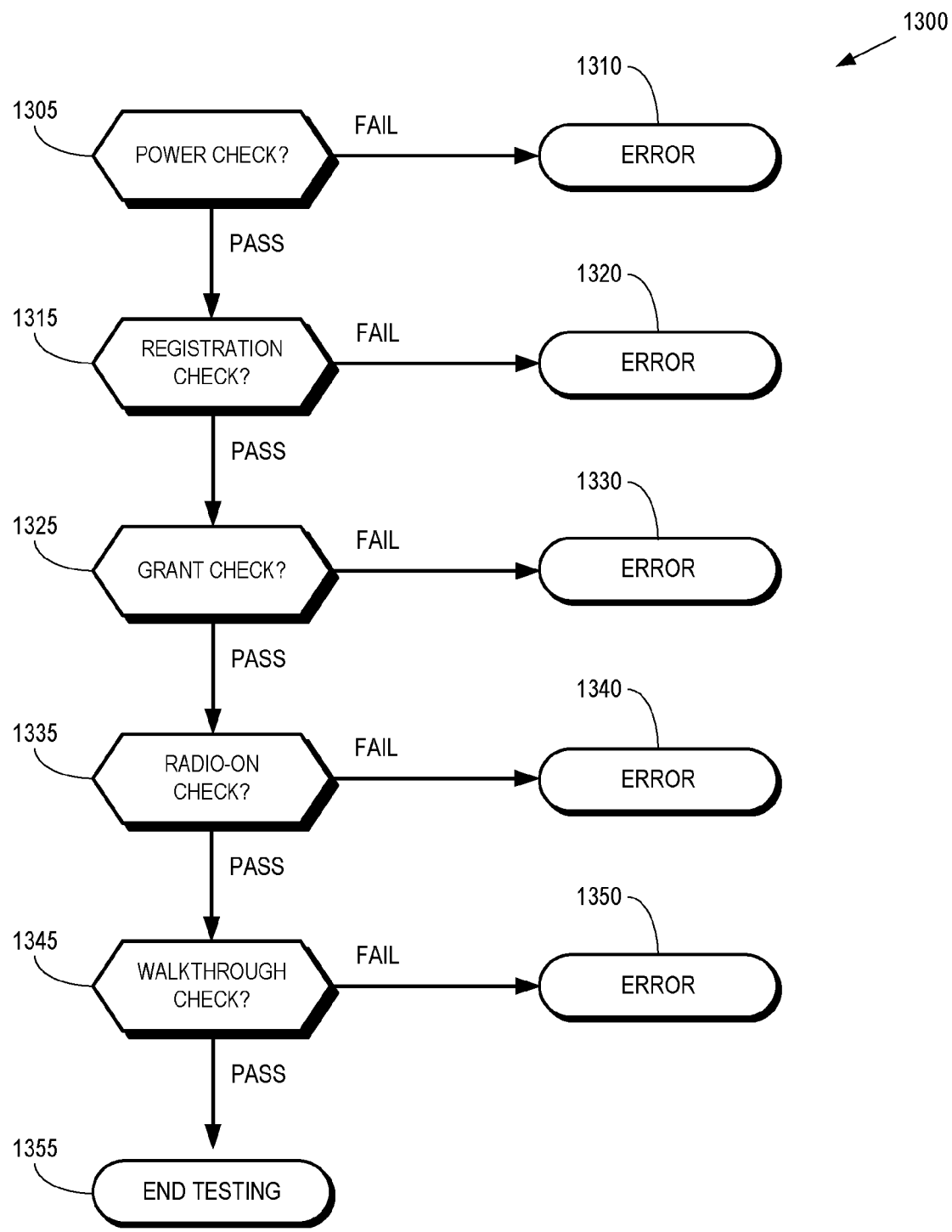
FIG. 13 is a flow diagram of a method of testing and verification of the CBSD performed by a technician such as a CPI according to some embodiments.

FIG. 13 is a flow diagram of a method 1300 of testing and verification of the CBSD performed by a technician such as a CPI according to some embodiments. The method 1300 is performed by an SAS and a technician in response to installing one or more CBSDs and in response to the SAS verifying CBSD data provided by the technician. The method 1300 is implemented in some embodiments of the SAS 115, 116 shown in FIG. 1, the primary SAS 405 shown in FIG. 4, the SAS 515 shown in FIG. 5, the SAS 605 shown in FIG. 6, and the SAS 835, 840 shown in FIG. 8.

At decision block 1305, the SAS provide instructions to the technician to turn on the CBSD. The technician then determines whether the CBSD entered the power down state. If not, the SAS generates an error at block 1310. If the CBSD successfully powered up, the method 1300 flows to decision block 1315.

At decision block 1315, the SAS instructs the technician to determine whether the CBSD successfully registered with the system. If not, the SAS generates an error at block 1320. If the CBSD successfully registered, the method 1300 flows to decision block 1325.

At decision block 1325, the SAS instructs the technician to determine whether the CBSD received a grant from the SAS. If not, the SAS generates an error at block 1330. If the CBSD successfully received a grant, the method 1300 flows to decision block 1335.

At decision block 1335, the SAS instructs the technician to determine whether the CBSD received a grant that authorizes the CBSD to transmit signals on an allocated channel at an allocated transmission power. As discussed herein, the grant authorizing the CBSD to transmit can be a test grant that authorizes transmission for a limited time interval. If the CBSD did not receive the authorization grant, the method 1300 generates an error at block 1340. If the CBSD receives a grant that authorizes the CBSD to transmit, the method 1300 flows to decision block 1345.

At decision block 1345, the SAS instructs the technician to perform a walk-through check to verify that user equipment camp on the CBSD and the user equipment are able to receive data transmitted by the CBSD. As discussed herein, performing the walk-through check requires that the CBSD is authorized to transmit on the allocated channel, e.g., by receiving a test grant. If the technician determined that user equipment do not camp on, or receive data transmitted by, the CBSD, the SAS generates an error at block 1350. If the user equipment camps on the CBSD and receives data transmitted by the CBSD, the CBSD has passed the testing and verification phase. In response to passing, the method 1300 flows to block 1355 and the method 1300 ends.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

As used herein, the term "circuitry" may refer to one or more or all of the following:
a) hardware-only circuit implementations (such as implementations and only analog and/or digital circuitry) and
b) combinations of hardware circuits and software, such as (as applicable):
  i. a combination of analog and/or digital hardware circuit(s) with software/firmware and
  ii. any portions of a hardware processor(s) with software (including digital signal processor(s), software, and memory(ies) that work together to cause an apparatus, such as a mobile phone or server, to perform various functions) and
c) hardware circuit(s) and/or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A spectrum access system (SAS) comprising:
a transceiver configured to receive a registration request from a first base station in response to the first base station being installed within a dynamic protection area; and
a processor configured to allocate a channel in a shared spectrum and a transmission power to the first base station, to estimate an updated aggregate interference level within the dynamic protection area by combining an aggregate interference level computed for at least one second base station during a previous Coordinated Periodic Activities Among SASs (CPAS) procedure with an interference level estimated for the first base station based on the transmission power and a path loss associated with the first base station, and to issue a test grant authorizing the first base station to temporarily transmit on the channel at the transmission power for a predetermined time interval in response to the updated aggregate interference level being less than or equal to a threshold value, wherein
the transceiver is configured to transmit the test grant to the first base station.

2. The SAS of claim 1, wherein the transceiver is configured to receive the registration request from the first base station in response to the first base station being installed in the dynamic protection area by a certified professional installer.

3. The SAS of claim 1, wherein the test grant remains valid for a duration that is an order of magnitude lower than a duration of a conventional valid grant issued by the SAS.

4. The SAS of claim 1, wherein the processor is configured to convert the test grant to a suspended grant, following the predetermined time interval, that allocates the channel to the first base station but does not authorize the first base station to transmit on the channel.

5. The SAS of claim 4, wherein the processor is configured to convert the suspended grant to a valid grant in response to successful performance of a CPAS procedure involving the SAS and at least one other SAS.

6. The SAS of claim 1, wherein the processor is configured to issue a suspended grant instead of the test grant in response to the updated aggregate interference level being greater than the threshold value, wherein the suspended grant allocates the channel to the first base station but does not authorize the first base station to transmit on the channel.

7. The SAS of claim 1, wherein the predetermined time interval is selected to provide sufficient time to perform testing of the first base station.

8. The SAS of claim 7, wherein the testing of the first base station comprises verifying that user equipment camp on the first base station and receive data transmitted by the first base station.

9. The SAS of claim 1, wherein the processor is configured to issue an additional test grant in response to a request received after expiration of the test grant.

10. The SAS of claim 9, wherein the processor is configured to determine that testing of the first base station has failed when the additional test grant is issued a predetermined number of times.

11. A method comprising:
receiving, at a spectrum access system (SAS), a registration request from a first base station in response to the first base station being installed within a dynamic protection area;
allocating, at the SAS, a channel in a shared spectrum and a transmission power to the first base station;
estimating an updated aggregate interference level within the dynamic protection area by combining an aggregate interference level computed for at least one second base station during a previous Coordinated Periodic Activities Among SASs (CPAS) procedure with an interference level estimated for the first base station based on the transmission power and a path loss associated with the first base station;
issuing a test grant authorizing the first base station to temporarily transmit on the channel at the transmission power for a predetermined time interval in response to the updated aggregate interference level being less than or equal to a threshold value; and
transmitting, from the SAS, the test grant to the first base station.

12. The method of claim 11, wherein the receiving comprises:
receiving the registration request from the first base station in response to the first base station being installed in the dynamic protection area by a certified professional installer.

13. The method of claim 11, wherein:
the test grant remains valid for a duration that is an order of magnitude lower than a duration of a conventional valid grant issued by the SAS.

14. The method of claim 11, further comprising:
converting the test grant to a suspended grant, following the predetermined time interval, that allocates the channel to the first base station but does not authorize the first base station to transmit on the channel.

15. The method of claim 14, further comprising:
converting the suspended grant to a valid grant in response to successful performance of a CPAS procedure involving the SAS and at least one other SAS.

16. The method of claim 11, further comprising:
issuing a suspended grant instead of the test grant in response to the updated aggregate interference level being greater than the threshold value, wherein the suspended grant allocates the channel to the first base station but does not authorize the first base station to transmit on the channel.

17. The method of claim 11, wherein:
the predetermined time interval is selected to provide sufficient time to perform testing of the first base station.

18. The method of claim 17, wherein the testing of the first base station comprises verifying that user equipment camp on the first base station and receive data transmitted by the first base station.

19. The method of claim 11, further comprising:
issuing an additional test grant in response to a request received after expiration of the test grant.

20. The method of claim 19, further comprising:
determining that testing of the first base station has failed when the additional test grant is issued a predetermined number of times.

21. An apparatus comprising:
    at least one processor; and
    at least one memory including computer program code;
    the at least one memory and the computer program code configured to, with the at least one processor, cause the apparatus at least to perform:
        receiving, at a spectrum access system (SAS), a registration request from a first base station in response to the first base station being installed;
        allocating, at the SAS, a channel in a shared spectrum and a transmission power to the first base station;
        performing, at the SAS, an on-demand Coordinated Periodic Activities Among SASs (CPAS) procedure for the first base station to estimate aggregate interference to one or more nearby incumbents based on previously calculated interference from a subset of previously installed base stations and estimated interference from the first base station;
        issuing, at the SAS, a test grant authorizing the first base station to temporarily transmit on the channel at the transmission power for a predetermined time interval when the aggregate interference is less than or equal to a threshold value; and
        transmitting, from the SAS, the test grant to the first base station.

22. The apparatus of claim 21, wherein the at least one memory and the computer program code are further configured to, with the at least one processor, cause the apparatus at least to perform:
    determining, based on the aggregate interference, the transmission power that is allocated to the first base station for a duration of the test grant.

23. The apparatus of claim 21, wherein the at least one memory and the computer program code are further configured to, with the at least one processor, cause the apparatus at least to perform:
    declining the test grant when the aggregate interference is greater than the threshold value.

24. The apparatus of claim 21, wherein the at least one memory and the computer program code are further configured to, with the at least one processor, cause the apparatus at least to perform:
    converting the test grant to a suspended grant, following the predetermined time interval, that allocates the channel to the first base station but does not authorize the first base station to transmit on the channel.

25. The apparatus of claim 21, wherein the at least one memory and the computer program code are further configured to, with the at least one processor, cause the apparatus at least to perform:
    issuing a suspended grant instead of the test grant when the aggregate interference is greater than the threshold value, wherein the suspended grant allocates the channel to the first base station but does not authorize the first base station to transmit on the channel.

* * * * *